United States Patent [19]

Miller

[11] 3,863,200
[45] Jan. 28, 1975

[54] BUILT-IN SEISMOMETER AMPLIFIER

[75] Inventor: James Willard Miller, Tulsa, Okla.

[73] Assignee: Amoco Production Company, Tulsa, Okla.

[22] Filed: Jan. 15, 1973

[21] Appl. No.: 323,543

[52] U.S. Cl............. 340/15.5 GC, 340/17, 330/109
[51] Int. Cl............................................. G01v 1/00
[58] Field of Search.............. 340/17, 15.5; 330/109

[56] References Cited
UNITED STATES PATENTS

| | | | |
|---|---|---|---|
| 2,164,196 | 6/1939 | Woodyard | 340/15.5 |
| 3,517,316 | 6/1970 | Anderson | 340/17 |
| 3,525,048 | 8/1970 | Peterson | 330/109 |
| 3,718,901 | 2/1973 | Davis | 340/17 |

OTHER PUBLICATIONS

QST Magazine, May 1971, American Radio Relay League, page 29.

Primary Examiner—Maynard R. Wilbur
Assistant Examiner—T. M. Blum
Attorney, Agent, or Firm—Paul F. Hawley; John B. Farr

[57] ABSTRACT

An improved seismic detector system using a seismometer in conjunction with a self-contained, impedance-buffering integrated circuit amplifier which reduces the deleterious cross-feed and highline noises induced in long seismic cables. In addition to its impedance-buffering properties, the integrated circuit isolates the individual seismometers from the variable damping resistances due to different length conductors in the seismic cable. To attenuate undesirable seismic noise arriving at group locations, each unit has a gain control which provides a simple way to adjust the output amplitude of each of the seismometers making up the group, thereby permitting improved spatial filter design. The unit may also contain an active filtering element permitting optimization of the seismometer frequency response characteristics to attenuate high level frequency-separable seismic noise at the seismometer, thereby reducing cross-feed of such noise in the seismic cable. In addition, the active filter in each unit may be used to modify the frequency response of the seismometer; for example, to compensate for the distributive high frequency filter effect of the earth itself.

12 Claims, 9 Drawing Figures

Patented Jan. 28, 1975

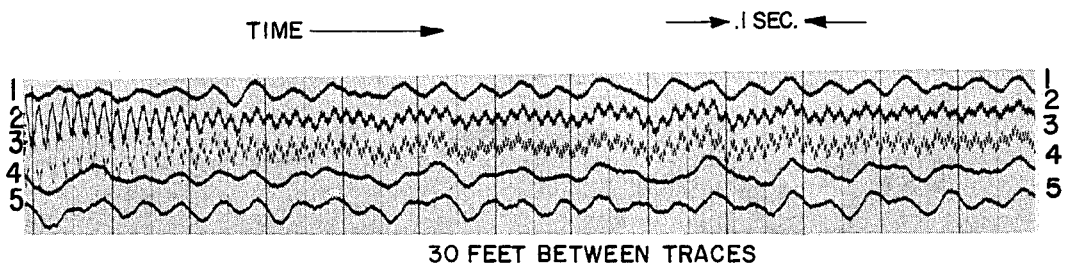
FIG. 4A
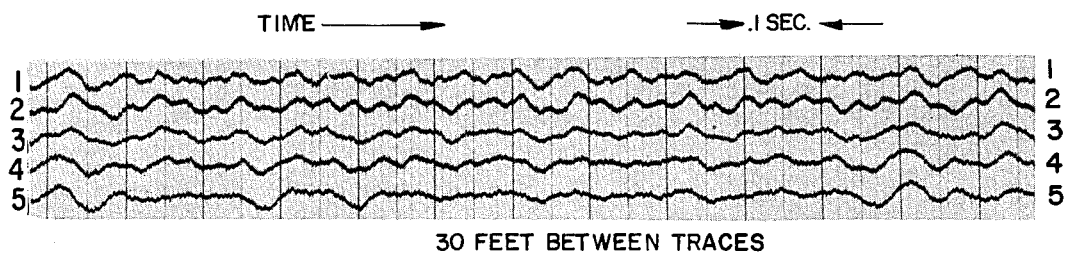
FIG. 4B
FIG. 4

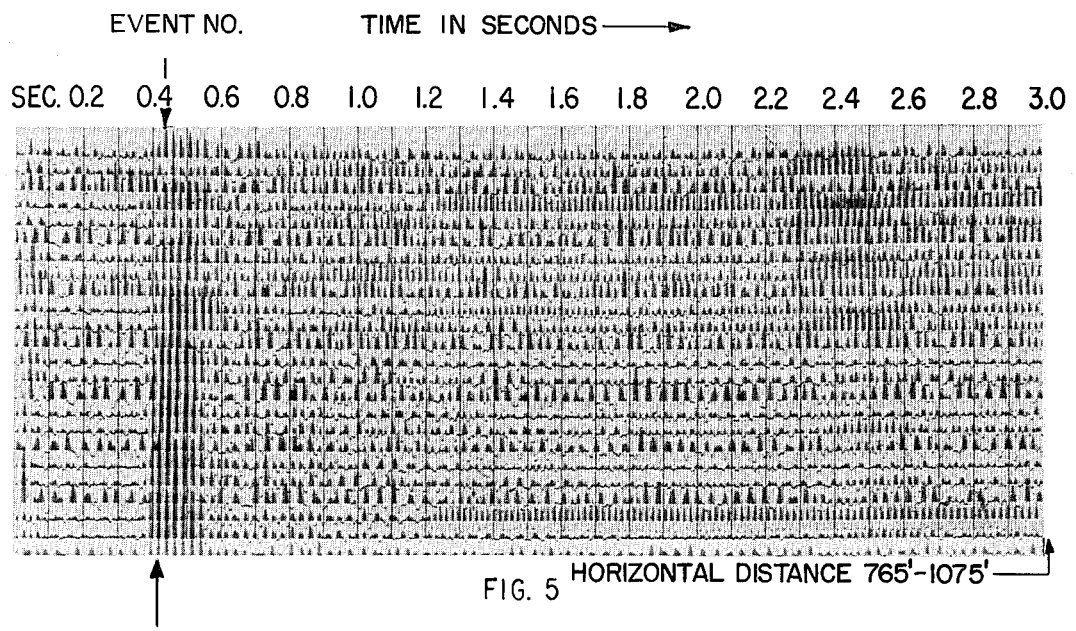
FIG. 5 HORIZONTAL DISTANCE 765'-1075'
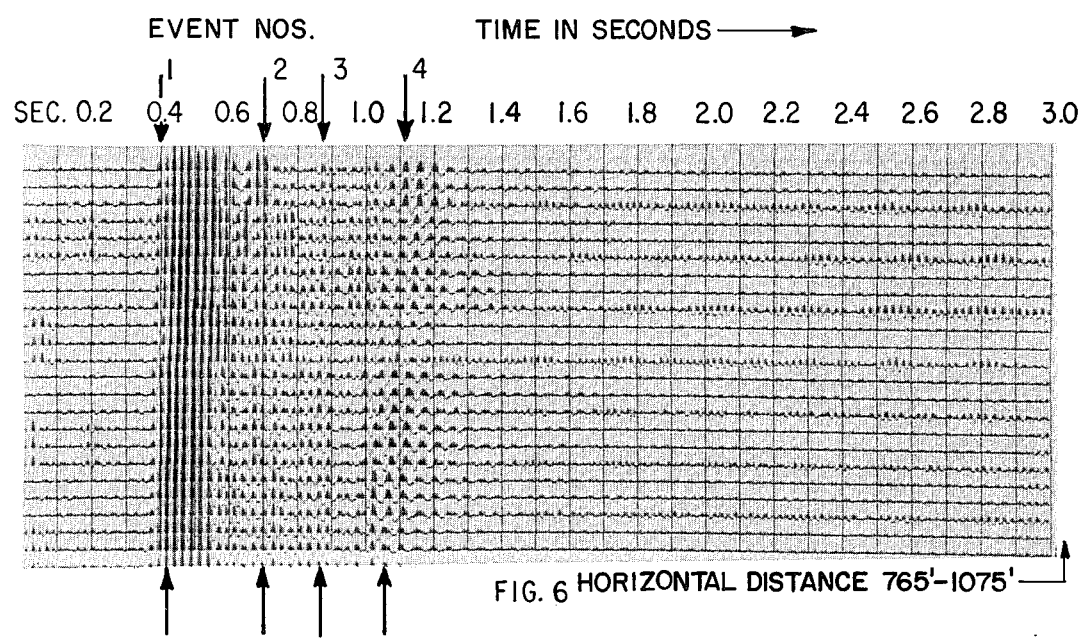
FIG. 6 HORIZONTAL DISTANCE 765'-1075'

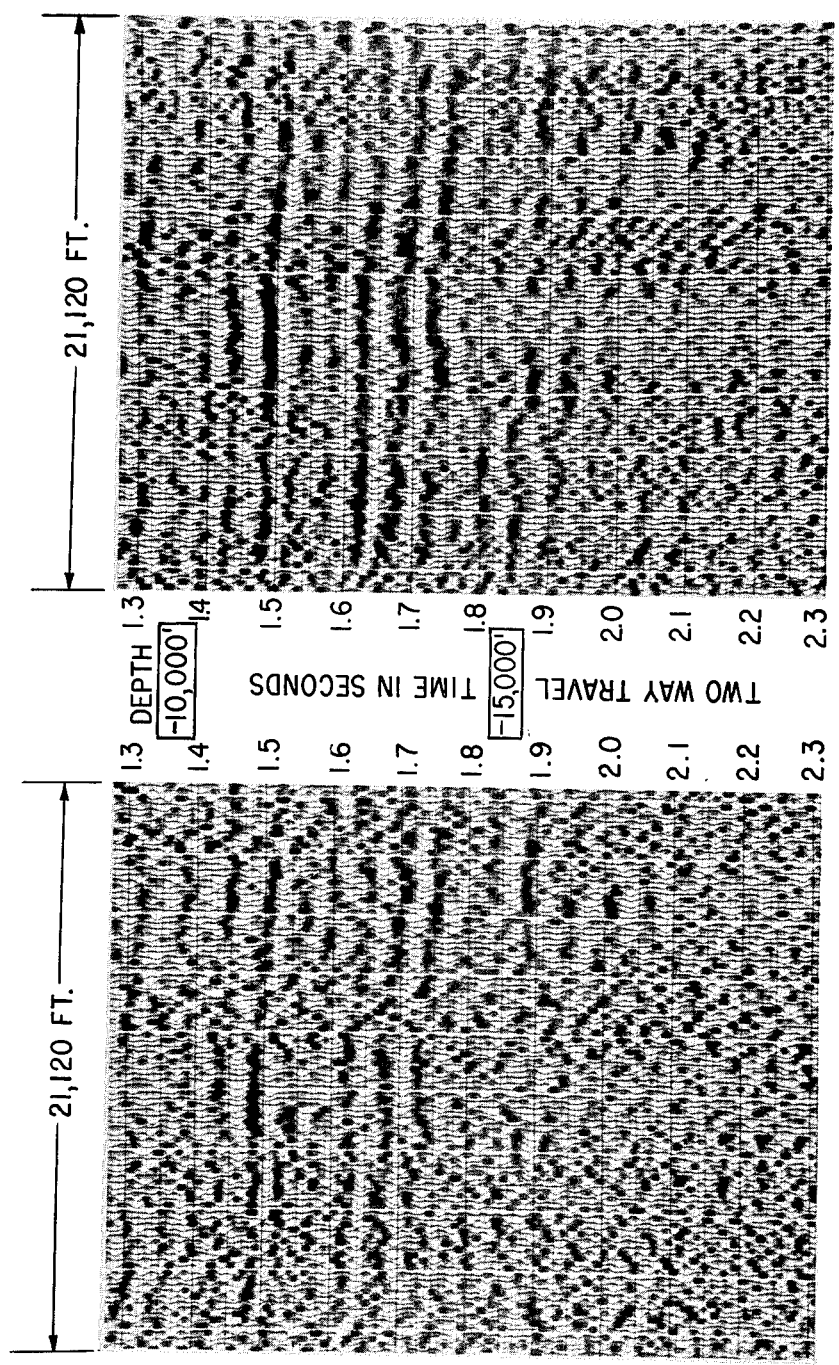

BUILT-IN SEISMOMETER AMPLIFIER

BACKGROUND OF THE INVENTION

This invention relates generally to the reduction of noises generated in long seismic cables and arrays used in seismic prospecting and more particularly to the combination of isolation and impedance-buffering integrated circuits and seismometers to attenuate these undesirable noises. One of the most common types of seismometers used in connection with seismic prospecting is the velocity-sensitive type, consisting essentially of a magnet and a coil of wire constructed so that the coil is spring suspended to permit motion relative to the magnet. When elastic waves impinge upon the seismometer, causing this relative motion, output voltage is produced which is indicative of the velocity amplitude and the frequency of the impinging waves. This voltage is usually amplified and recorded at a remote location many thousands of feet away from the seismometer.

The frequency response of a seismometer will exhibit a peak at the natural mechanical resonance of the mechanical device. This peak is usually smoothed out by damping which is achieved by allowing the seismometer coil to supply current to an external load since the current flowing through the coil winding interacts with the magnetic field so as to generate a force which opposes the motion of the suspended mass. The more current that is permitted to flow, the greater is the damping factor but the lower is the sensitivity near the mechanical resonance frequency. In the seismic prospecting art it is highly desirable to maintain a constant damping factor for each seismometer regardless of its position on the ground so that any change seen in the final recordings may be attributed to changes in the subsurface reflecting horizons rather than the electrical and/or mechanical equipment variations.

The long cables or transmission lines commonly used to connect a single seismometer to the remote recording apparatus have a tendency to pick up undesired interfering signals from other seismometers as well as from other unrelated sources such as 60-hz power lines. This tendency is greatly reduced when the seismometer source impedance which the seismometer offers to the transmission line is kept very low. The seismometer sensitivity, that is, the number of volts generated per inch per second of ground movement, is proportional to the number of turns of wire in the moving coil element. Greater sensitivity can be achieved by using a larger number of turns in the coil. However, this also raises the seismometer's impedance thereby increasing the undesirable noise pickup is the cables.

In certain application such as prospecting in water-covered areas, piezo-electric crystals or ceramics are used as seismometer elements. The piezo-electric crystals have a low frequency response which is dependent upon the termination impedance of the crystal. To achieve a suitable sensitivity at seismic frequencies a relatively high termination impedance is essential, while to efficiently transmit signals down the seismic cables a low impedance is required. Commonly matching transformers are used with each crystal or group of crystal elements for this purpose. Vacuum tube amplifiers have also been used to perform the impedance matching function as well as to provide the additional gain required with low output piezoelectric transducers.

Combined piezo-electric seismometers and vacuum tube amplifiers are shown in Riber U.S. Pat. No. 1,902,184, Riber U.S. Pat. No. 1,919,480 and Brock et al U.S. Pat. No. 3,118,126 among others, and is well known in the prior art. The fragility of piezo electric elements has greatly restricted their use in land prospecting although they are extensively used as pressure-sensitive seismometers in water-covered areas. Vacuum tubes are not sufficiently rugged to withstand routine operational conditions encountered in placing seismometers on land and hence this type amplifier was not suitable for inclusion in a seismometer case except when employed in a marine environment. The power requirements of vacuum tube amplifiers are so high that they cannot routinely be met by internal batteries within the practical weight limits and operating life times required for land operation.

Moving-coil permanent magnet seismometers do not require the high termination impedance of the piezo-electric seismometers, and common practice has been to construct such units with relatively low impedance coils so that impedance transformation is not normally required at the seismometer end of the transmission line. Generally, special noise suppression circuits are included at the amplifier and recording apparatus end of the transmission line. Such circuits are well known in the prior art; see, for example, Woodyard et al. U.S. Pat. No. 2,164,196. These noise suppression circuits are common to all present day amplifying and recording systems. In many instances these are called highline rejectors since they are specifically designed to reject the most troublesome and the strongest extraneous noise, namely the 60-hz fundamental power line frequency found in the vicinity of most inhabited areas of the country.

These circuits worked moderately well with the relatively short, large conductor seismic cables in common use up to the past few years. The current trend in seismic prospecting is to use larger and larger numbers of individual recording channels. Where 24 to 36 channels were considered normal in the recent past, currently 48 to 96 channel systems are being manufactured and introduced into routine field operations. Consideration is being given to systems of several hundred channels. During this same period there has been a marked trend in the geophysical industry toward use of longer and longer surface arrays. This trend has resulted in cable length increases from a few thousand feet to as much as 24,000 feet. To keep the seismic field cables to a reasonable weight, both of the above factors have caused the reduction in the individual conductor diameter and a much closer spacing of the individual conductors in each seismic cable.

The increased conductor length has increased the level of noise induced in the conductors by external noise sources such as 60 hz from nearby highlines. In many cases this induced hum and noise is of sufficient magnitude to mask the weak seismic signals from the remote seismometers. This is particularly a problem at the seismic frequencies near or beyond 60 hz.

The reduced conductor diameter results in an increased resistance which in turn adversely affects the overall system sensitivity as well as the individual seismometers' damping characteristics. When connected to the pair of wires running to the far end of the seismic cable, the seismometers are damped with a much higher conductor resistance than the same seismometers positioned at the near end of the same cable. The variable seismometer damping caused by these changes in individual conductor resistances has resulted in deleterious variations in channel-to-channel response when data is analyzed or summed in the common depth point techniques in current use today.

Another serious problem encountered in using the relatively long conductors of very small diameter and separation results from the interconductor capacitance increasing the cross-feed between individual conductors and hence between individual channels. Also the increased capacitance results in a high frequency filtering action which attenuates the seismic signals relative to the noise induced in the cables.

It is well known in the seismic prospecting art that certain noises can be discriminated against by frequency filtering. For example, Rayleigh-type surface wave motion, commonly called "ground roll," is generally quite low in frequency and the use of low-cut electrical filtering can effectively separate this type of noise from the desired signal. This type of noise is commonly much larger than the desired seismic signals coming from the subsurface discontinuities. This noise is normally attenuated by low-cut electrical filter networks incorporated in the amplifying and recording instruments at the far end of the seismic cable. Due to their large magnitude, these noises may cross-feed between adjacent channels. The current trend toward smaller, more closely packed conductors in the seismic cables has aggravated this tendency to cross-feed. By using active filter networks in each seismometer, these noises may be attenuated before cross-feed can occur.

Noise reduction, particularly of the strong Rayleigh or surface wave type, is also accomplished by the use of spatial filters where the outputs of a number of individual seismometers spaced along the surface are electrically combined prior to feeding into a single input channel. This spatial filtering is used in addition to the frequency filtering mentioned above. It is well known in the seismic prospecting art that spatial filters, that is, group arrays made up of many individual seismometer elements, are more effective if the individual seismometer elements are weighted such that their amplitudes are changed from seismometer to seismometer according to some given function. See Parr & Mayne, *Geophysics* 20, pp 539–564, July 1955. For example, it has been found that arrays using Chebyshev optimization are more effective in eliminating the undesired noises than those where the individual seismometers in the array are equally weighted. See Holzman, *Geophysics* 28, pp 145–155, April 1963. Great difficulty has been encountered when attempting to non-uniformly weight individual array seismometers in normal field practice. As many as 96 individual seismometer elements with perhaps as many as 24 different weights might be connected together to form the array input to one single seismic channel. When fixed built-in resistive attenuator networks were used to change the individual seismometer weights, a very large number of different sensitivity seismometers, each one clearly marked, were required for each channel. This large number of different seismometers, each with its own different internal resistive network, led to great confusion in the field operations and consequently has not been adopted by most operators. In addition, use of resistive networks dissipated power thereby decreasing the overall array sensitivity. To overcome these drawbacks, additional seismometers of the same sensitivity, i.e., unity weight, have been used to provide integer weighting of individual elements in the array. For example, the center element in a tapered array might consist of eight interconnected seismometers of unity weight placed immediately adjacent to each other on the ground. The next two elements would consist of four unity weight seismometers placed side by side; then two identical seismometers side by side; and finally, one seismometer at the end points of the individual array. This procedure, while simpler in field operation and increasing the sensitivity of the overall array, requires a much larger number of individual seismometers and does not provide optimum array design since only integer weights can be employed. Be providing adjustable gain controls on each seismometer, array design can be simplified and optimized in the field.

Another serious problem encountered in seismic prospecting is the lack of high frequencies resulting from the filtering effect of the earth itself. It is well known that the earth acts as a distributive filter and attenuates the higher seismic frequencies at a rate of 12 to 24 db per octave. See Levin and Wynn, *Geophysics* v23, pp 639–664, 1958. To improve the resolution of the seismic surveying method it is desirable to record the higher seismic frequencies. The rugged moving coil seismometer that is almost exclusively used in land geophysical prospecting has a frequency characteristic that is approximately flat above its 4 to 15 hz mechanical resonance point. The very much larger natural level of the received seismic signals in the frequency band near the seismometer resonance point overrides the higher frequency components which are useful in detailed delineation of near surface reflecting horizons. Increasing the spring stiffness, thereby raising the mechanical resonance point of the seismometer, will provide the desired high frequencies but only at the expense of seismometer sensitivity.

Piezo-electric crystals have been suggested for this type of high frequency seismometer as shown in Morris U.S. Pat. No. 3,489,997. Preamplification within piezoelectric seismometers has been necessitated by the very low output of the crystal elements. The Morris amplifier differs from the present invention in that it is not internally powered, necessitating additional leads in the cable and an external battery, and that its sole purpose is to provide increased gain rather than impedance buffering. The interstage filtering action described by Morris occurs at the amplifier and recording apparatus end of the long seismic cables.

The newer cables due to use of thinner insulation and increased length have a high inter-conductor capacitance which acts to further increase the attenuation of these desired high seismic frequencies. Since the extraneous noises picked up by the cables are most severe in the high frequency region, it is desirable to provide low-cut filtering at the seismometer thereby increasing the relative level of the high frequency seismic signals to the hum or noise induced in the long seismic cable by extraneous sources.

A remote seismic pre-amplifier system has been described by Erath U.S. Pat. No. 3,544,877 for use in conjunction with a seismometer. Erath's amplifier is not included in the seismometer case and consequently hum and noises will be induced in the high impedance input cables leading from the seismometer to the pre-amplifier. In addition, Erath uses an input transformer which must be changed to provide gain changes. The relatively high current drain of the Erath pre-amplifier necessitates use of a special auxiliary charging circuit to permit battery recharging between periods of use.

The primary object of my invention is to improve the seismic signal to cable induced noise ratio thereby bringing out weak reflecting horizons heretofore lost in the background noise.

Another object of my invention is to more effectively reduce the natually occurring noise waves by improving the spatial filtering effectiveness of seismometer arrays through use of individual seismometer gain controls which are easily adjustable on-site.

Still another object of my invention is to provide selectable seismometer frequency response to more effectively reduce interfering noise waves and to provide compensation for the higher seismic frequencies attenuated by distributive filtering in the earth.

Yet still another object of my invention is to increase the sensitivity of moving coil-permanent magnet seismometer elements by permitting use of an increased number of turns of wire and the concurrent increased output impedance without degrading the overall seismic system through the resulting increased noise pickup.

SUMMARY OF THE INVENTION

The objects of my invention are accomplished by combining within a single case a seismometer element, one or more small monolithic integrated circuit amplifiers, batteries and associated electronic components. The circuit is designed specifically to improve the seismic signal to induced noise ratio by impedance-buffering and isolation between the seismometer and the long variable impedance conductors leading to a remote amplifier and recording apparatus.

By incorporating an integrated circuit operational amplifier, the seismometer's output impedance is reduced from the typical 150 to 960 ohms to a few ohms (typically not over about 10 ohms) at normal signal levels. This low seismometer output impedance strongly attenuates the undesired noise induced in the long conductors by nearby power lines and other extraneous sources. It simultaneously isolates the seismometer from the conductors, providing uniform damping characteristics independent of the differing load resistances resulting from changes in conductor length due to the seismometer's position along the cable relative to the remote amplifier and recording apparatus.

The basic operational amplifier unit has a high impedance differential input which also reduces extraneous noise by maintaining good common mode rejection without recourse to relatively large and expensive input transformers, as taught in the prior art. Use of the amplifier immediately adjacent to the seismometer element eliminates the low impedance noise restriction which has heretofore limited the sensitivity of moving coil-permanent magnet seismometers. Seismometer coils with many more turns of wire and hence much higher voltage output can be utilized since the coil's high impedance output is directly fed to the high impedance amplifier input with little or no chance for the pickup of extraneous noise. Seismometers with such increased sensitivities, having coil impedances in the 10,000 to 30,000 ohm range have successfully been employed in various embodiments of my invention. Such high sensitivity moving coil seismometers cannot be used directly with the long seismic cables since the increased noise pickup overrides the increased signal output obtained by their use.

The very low 1 to 10 ohm output impedance is maintained over a limited range of amplifier gain settings, permitting adjustment in seismometer amplitude levels in the field. A variable gain control may be incorporated in each seismometer, facilitating spatial filter optimization on site after the units are positioned in the field array. Amplitude changes of from one-eighth to four times the amplitude of a single seismometer can be readily achieved without degrading the desired impedance-buffering property.

Other objects of my invention are accomplished by modification or combination of the basic operational amplifier circuits. The feedback networks used with the various operational amplifier stages may be combinations of linear or non-linear elements selected to yield any desired amplifier transfer function and therefore any desired seismometer response.

By suitably adjusting the quiescent current of the amplifier, power consumption of the unit can be reduced to such a low level that internal batteries can provide sufficient power for more than one year's operation. The elimination of troublesome external charging circuits and the necessity for battery replacement at frequent intervals is another significant advantage of my invention. Due to their long life, the batteries may be permanently encapsulated within the seismometer, thereby increasing the ruggedness of the entire unit while eliminating possible moisture entry points which can be adversely affect the operation of the unit.

These and other objects, features and advantages of my invention will be apparent from the detailed description.

BRIEF DESCRIPTION OF THE DRAWINGS

FIG. 4A and 4B is a reproduction of a portion of a seismic recording showing the noise suppression obtained on individual channels when my invention is employed.

FIG. 5 is a reproduction of a seismic record section obtained according to the prior art.

FIG. 6 is a reproduction of the same seismic record section shown in FIG. 5 when obtained according to the present invention.

FIG. 7A and 7B is a reproduction of the deeper portions of two seismic record sections showing improvement in deep reflection continuity and detectability when the present invention is employed in the recording process.

DETAILED DESCRIPTION OF PREFERRED EMBODIMENT

Figure 1:
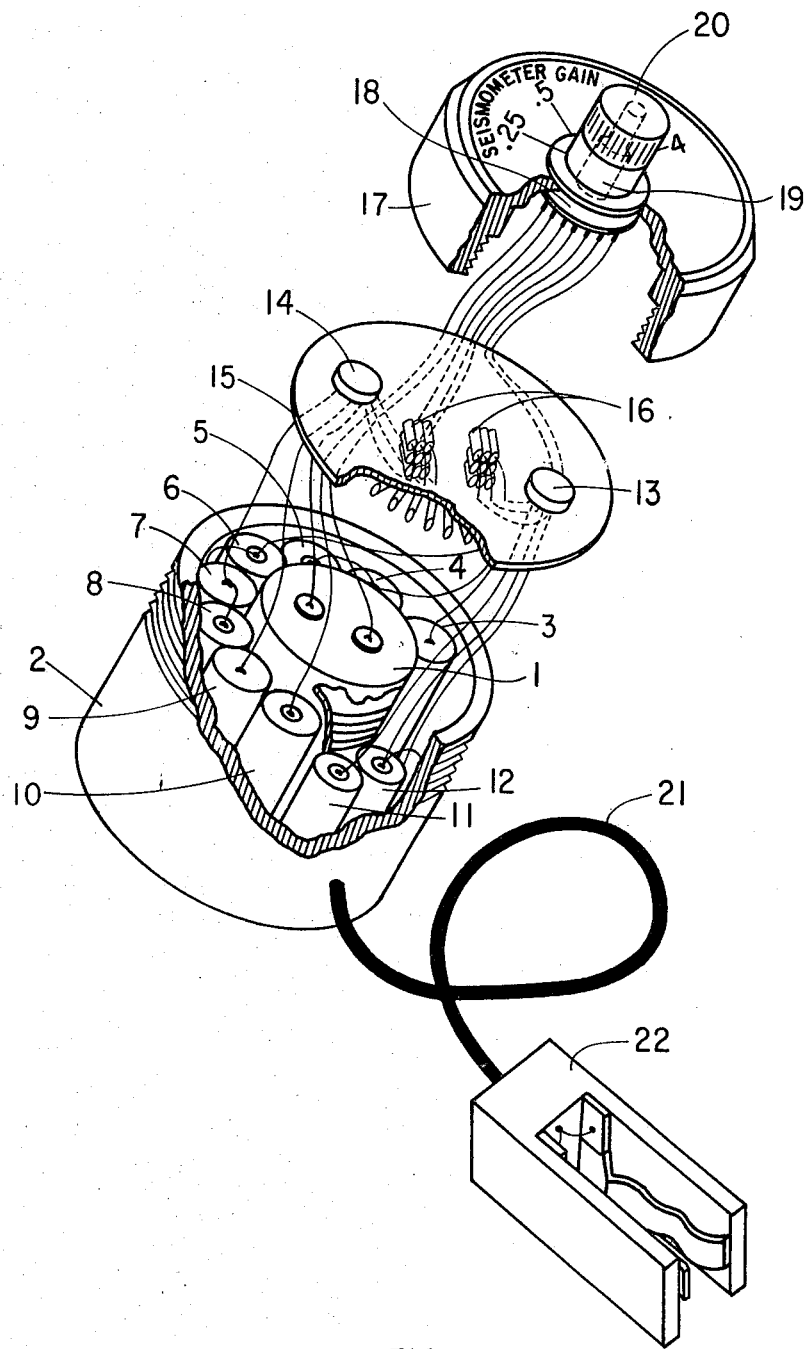
FIG. 1 is a perspective view of the seismometer element, two integrated circuit operational amplifiers, batteries and associated electronic components mounted in a conventional seismometer case according to my invention.

Attention is now directed to FIG. 1 which illustrates the preferred seismometer-amplifier unit constructed in accordance with my invention.

The basic seismometer element 1 is a common seismic wave transducer of the velocity-sensitive type utilizing a permanent magnet for producing a strong magnetic field within which is positioned a movable coil support carrying an electrical winding. A wide variety of such moving coil velocity seismometers are used throughout the seismic prospecting industry due to their extreme ruggedness and reliability under adverse handling conditions.

The particular element used in this unit is the Mark Products, Inc. Model L-15 digital grade land geophone. Their Model L-10 or any similar sized element produced by other manufacturers could be used interchangeably. Typical of such other units are the Geo Space Corporation Model GS-11D, the Electro-Technical Laboratories Model EV-22 and the Houston Products Crop. Model HP-1B. All of the companies are located in Houston, Tex. The detailed description and characteristics of the L-15 element is given in the catalog of Mark Products, Inc., 10507 Kinghurst Drive, Houston, Tex. 77072.

The L-15 seismometer element 1 is firmly affixed to the center of a Mark Products, Inc. High Impact Lexan plastic seismometer case 2. A special cement, Uralane No. 8089, manufactured by Furane Plastic Co., 16 Spielman Rd., Fairfield, N.J., is used for this purpose.

A plurality of Mallory MN 9100 Mod 1, long-life alkaline batteries 3, 4, 5, 6, 7, 8, 9, 10 are fitted into the annular space between seismometer element 1 and plastic case 2. The remaining annular space is filled with two Kemat T 140D337M015AS coupling capacitors 11 and 12 which have the requisite large capacity with physical dimensions comparable to those of the alkaline batteries.

The integrated circuit operational amplifiers 13 and 14 are attached to circular mounting board 15. In some embodiments only a single operational amplifier 13 is required as will be explained below. The amplifiers used in the preferred embodiment are Solitron Devices, Inc. Model UC 4250. This is a high performance monolithic, operational amplifier which requires only microwatts of standby power. Each such unit contains 18 transistors and diodes along with associated resistors, all packaged in a TO-99 transistor case about ⅛inch in diameter and 1/6-inch high. These operational amplifiers are commercially available from a variety of manufacturers and will not be discussed in detail. Full specifications, operating characteristics of the UC 4250 are described in a brochure obtainable from Solitron Devices, Inc., 8808 Balboa Ave., San Diego, Cal. 92123. Equivalent operational amplifiers are the National LM 4250, Fairchild U5B7776393 or the Intersil 1CL8021 CTY.

Other circuit components 16 except the aforementioned two large coupling capacitors 11, 12 are affixed to the upper and lower sides of mounting board 15. Watertight plastic cap 17 screws onto case 2 completing the unit. When variable gain control of individual seismometer units is desired, a wafer switch 18 is mounted on cap 17, with switch shaft 19 protruding through the cap and attached to gain control know 20. Switching of fixed resistors to change gain is preferred over a variable control because the repeatable settings needed in spatial array design are more easily obtained. Electric cable 21 passes through case 2 and connects the seismometer-amplifier output to connector 22 which is used for attachment to the long transmission line leading to the remote amplifier and recording apparatus.

To assure mechanical stability, the entire unit is filled with a compound, such as Central Electric RTV-602 silicone compound, which provides shock and vibration protection in addition to insulation and moisture protection.

Figure 2:
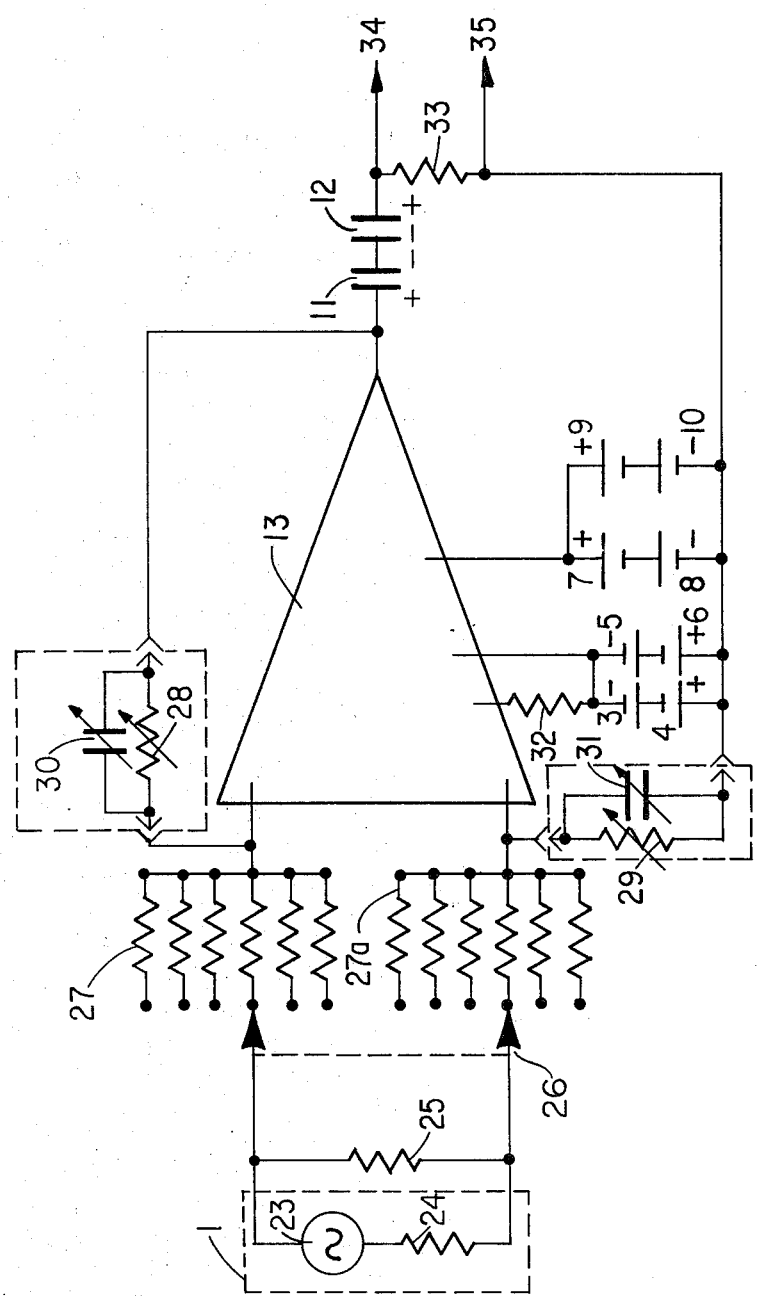
FIG. 2 is a circuit diagram of the variable gain and impedance-buffering embodiment of the combined seismometer-amplifier system.

FIG. 2 shows the circuit used in the impedance buffering-variable gain embodiment of my invention.

The seismometer element 1 enclosed in the dashed line can be characterized as an A.C. generator 23 having internal resistance 24. The internal resistance of seismometer elements of the moving coil-permanent magnet type can range from 24 to over 30,000 ohms.

Depending on the element used, an appropriate damping resistance 25 is used to give the desired damping. Commonly, 60 percent of critical damping is considered optimum. Size of the resistor depends on the coil turns, magnetic field, etc., and may range from 62 to 28,000 ohms.

Gain control switch 26 is used to introduce selected resistances into the differential input circuit of the operational amplifier 13. The individual resistors in resistor array 27, 27a are chosen such that with appropriate feedback resistor 28 and equilization resistor 29 the overall amplifier gain can be adjusted to desired values between one-eighth and four times unity gain. At these gain values, the amplifier has an output impedance of 10 ohms or less due to its high open-loop gain and the large amount of feedback provided by resistor 28 and capacitor 30. Proper balance of the differential input circuit is maintained by resistor 29 and capacitor 31 which are matched to resistor 28 and capacitor 30.

Resistor 32 is used to adjust the amplifier quiescent current to a very low level, typically less than 30 microamperes which gives battery life in excess of one year or essentially shelf life. Blocking capacitors 11 and 12 allow the A.C. signal to pass to the unit output terminals 34, 35 while resistor 33 provides protection for the remote amplifier.

Figure 3:
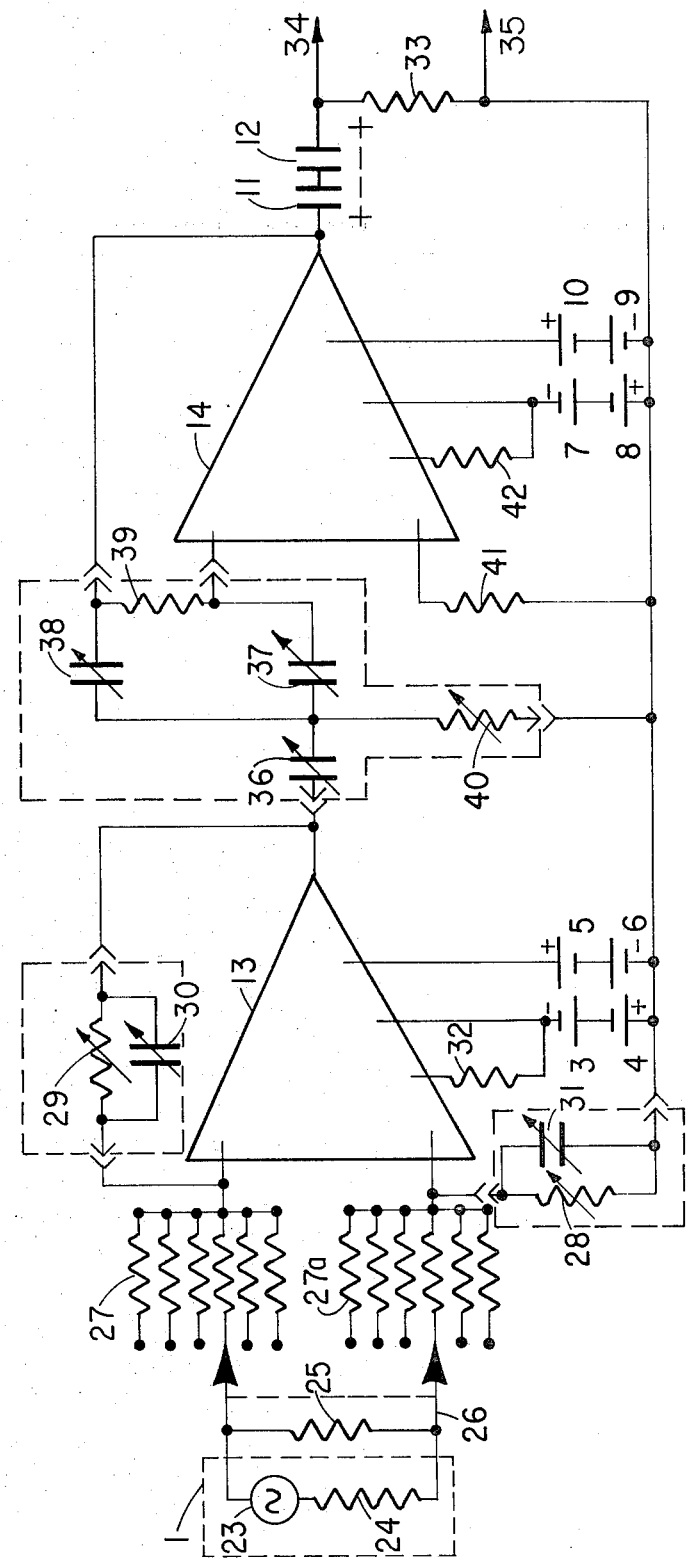
FIG. 3 is a circuit diagram of the preferred embodiment of the combined amplifier-seismometer shown in FIG. 1. A second integrated circuit element has been added to the circuit shown in FIG. 2 to provide improved low frequency noise rejection and high frequency signal emphasis.

In one embodiment the following circuit parameters were found satisfactory for a seismometer resistance, 24, of 150 ohms:

Resistor 25 — 1300 ohms
Resistor array 27, 27a — 24,900 to 809,000 ohms
Resistors 28, 29 — 100,000 ohms
Capacitors 30, 31 — 390 picoforads
Resistor 32 — 1.58 megohms
Capacitors 11, 12 — 330 microforads
Resistor 33 — 5,000 ohms
Batteries 3, 4, 5, 6, 7, 8, 9, 10 — 1.5 volt FIG. 3 shows the circuit diagram of the preferred embodiment illustrated in FIG. 1 where a second integrated circuit stage 14 has been added to the single amplifier 13 illustrated in FIG. 2. This addition provides an active low-cut filter to further improve the noise rejection beyond that provided by the impedance-buffering and variable gain properties discussed above.

The second integrated circuit amplifier is connected in the conventional inverting configuration with the low-cut filtering action provided by the network consisting of resistors 39 and 40 with capacitors 36, 37 and 38. The design criteria for this network is given in *Operational Amplifiers, Design and Application;* Araeme, Tobey and Huelsman; McGraw Hill, 1971, especially pages 288 to 295.

Resistor 41 is used to maintain the non-inverting operational amplifier input at the same D.C. potential as the inverting input. Output capacitors 11 and 12 and the load resistor 33 perform the same function as discussed above.

The batteries 3, 4, 5, 6, 7, 8, 9, 10 are separated in this embodiment so that each amplifier stage has its own isolated power supply. Quiescent current adjusting resistors 32, 42 are chosen to minimize the power drain of each amplifier.

In one embodiment the following parameters were used to provide a 12 db/octave low cut at frequencies below 100 hz with a 150 ohm seismometer coil resistance, 24.

Resistor 25 — 1,300 ohms
Resistors 28, 29, 39, 41 — 332,000 ohms
Capacitors 30, 31 — 385 picoforads
Resistors 32, 42 — 1.58 megohms
Resistor 40 — 75,000 ohms
Capacitors 36, 37, 38 — 0.0041 microforads
Capacitors 11, 12 — 330 microforads
Resistor 33 — 5,000 ohms
Batteries 3, 4, 5, 6, 7, 8, 9, 10 — 1.5 volt An example of the improvement obtained using my invention is shown in FIGS. 4A and 4B. In FIG. 4A, impedance buffering amplifiers were used in conjunction with the seismometers generating the signals, portions of which are displayed on traces 1, 4 and 5. Traces 2 and 3 were recorded according to the prior art without impedance buffering circuits. Single Geo Space Model 11D 8 hz seismometers having 380 ohm coils were used for all five channels. The amplification was identical for each channel. The seismometers were 20 feet apart and the seismometer signals were fed through a 5080-foot jumper cable to the amplifying and recording apparatus. Moments after the first recording was made, additional impedance buffering circuits built according to my invention were interposed between the seismometers and seismic cables at the groups providing signals to channels 2 and 3. This recording is shown in FIG. 4B. The reduction in noise is apparent. Although not illustrated, when no impedance buffering units were used the entire recording was noise similar to that shown on channels 2 and 3 of FIG. 4A.

These recordings were made with the previously mentioned state of the art suppression circuits at the amplifier-recorder end of the seismic cables in full operation. This illustrates that the state-of-the-art highline rejectors, even though providing 66 db attenuation at 60 hz, could not suppress the extraneous noise induced in the cables.

A second example of the improvement in seismic data quality achieved by use of my invention is shown in FIGS. 5 and 6.

FIG. 5 is a display of seismic traces recorded according to the prior art. A single 380-ohms Geo Space Corporation Model 11D, 8 hz seismometer was used to generate the electrical signal recorded on each trace. A 5800-foot cable was used. It had a resistance of 695 ohms to the closest seismometer and 770 ohms to the furthest seismometer. The seismometers were 30 feet apart with the closest seismometer being 1075 feet from the source point. A high-cut recording filter, having its 6 db down point at 64 hz, was used in addition to a 60 hz highline notch filter which was 66 db down at 60 hz. Early in the record at 1, lineups corresponding to shallow reflections can be seen above the background noise level. Here, as in the example shown in FIG. 4, maximum state of the art noise suppression is being applied at the far end of the seismic cables in the amplifying and recording apparatus. The 60-hz power line noise has been attenuated by use of the 66 db notch filters but other frequency external noise is seen at a high level both before and after the reflection information has arrived at the seismometers. The addition of impedance-buffering circuits built according to my invention is the only change made between the recording shown in FIG. 5 and that shown in FIG. 6. Background noise suppression is immediately apparent on FIG. 6. But more important is a series of additional lineups 2, 3, 4 representing deeper reflections which can only now be seen above the noise.

FIG. 7 shows a comparison of the deeper portions of two seismic record sections prepared from data taken simultaneously at identical seismometer surface positions. Signals from arrays of 24 individual seismometers spaced 19 feet apart were combined to provide spatial filtering. Mark Products, Inc. Model 10B, 8 hz seismometers were used. These seismometers have a 138 ohm internal resistance and were damped with an external shunt of 470 ohms. The cables were over 7500 feet long, the nearest seismometer group being 2,200 feet and the farthest seismometer group 10,400 feet from the remote amplifying and recording apparatus. These cables have a single conductor resistance of approximately 70 ohms per 1,000 feet. The entire line is 21,120 feet long, each trace representing 220 feet of subsurface coverage.

The data shown on both panels was recorded and processed using indential state-of-the-art noise elimination techniques, the only difference being that the data on the right was taken using impedance buffering and isolation units built according to my invention.

Noise rejection techniques common to both sections include spatial filtering with a 24 seismometer 440-foot uniformly weighted seismometer arrays, high-cut frequency filtering with a 64-hz 6-db down point recording filter, full 60-hz highline rejection notch filters having 66 db attenuation at 60 hz and 600 percent multifold compositing where redundant information from six different source and seismometer group locations are combined to maximize the reflection signal to background noise ratio.

Using my invention in addition to the above, improved continuity is seen on reflections at approximately 13,000-foot depth while reflections at 15,000-foot depth can be seen for the first time. This ability to bring out heretofore undetected weak reflections which have been lost in the background noise is the principal advantage of my invention.

While the invention has been described in connection with a preferred embodiment, modification will be readily apparent to those skilled in the art. For example, additional circuits to provide high-cut, band pass or band reject filtering may be added when required to attenuate noise in specific field environments.

What is claimed is:

1. In an improved noise-suppressing seismic system of the type having a plurality of individual seismometers each of which generate an electrical signal proportional to the ground motion at said individual seismometers, said seismometers each having two output terminals, a remote multichannel amplifying and recording apparatus to separately amplify and record said electrical signals from a group of at least one of said individual seismometers, said apparatus having a pair of input terminals for each said group, a means for transmitting said electrical signals from said individual seismometers to said multichannel amplifying and recording apparatus, said transmitting means having a pair of input terminals for each individual seismometer and a pair of output terminals for each group connected to the pair of input terminals corresponding to that group on said amplifying and recording apparatus, the improvement comprising:

1. an impedance-buffering monolithic operational amplifier, having a positive and a negative power supply terminal, a separate quiescent current control terminal, an inverting differential input terminal and a separate non-inverting differential input terminal as well as an output terminal;
b. means for connecting said differential input terminals to said individual seismometer's output terminals;
c. battery means adjacent said operational amplifier and connected to said power supply terminals for supplying a predetermined voltage thereto, said battery means having an intermediate point for output coupling;
d. means interposed between said battery means and said quiescent current control terminal of said operational amplifier for adjusting the quiescent current drain of said amplifier without appreciably altering said predetermined voltage at said positive and negative power supply terminals;
e. means for connecting said operational amplifier's output terminal to said transmission mean's first input terminal;
f. means for connecting said intermediate battery point to said transmission means' second input terminal; and
g. means including at least two resistors for providing a balanced feedback signal from said first operational amplifier's output to said first operational amplifier's differential input said balanced feedback signal being within an order of magnitude equal to said seismometer electrical signal such that the AC impedance at said output terminals is substantially less than the AC input impedance of said transmission means both measured at seismic frequencies.

2. A system as recited in claim 1 in which said operational amplifier, said battery means, said quiescent current adjusting means, and said feedback means are located within said individual seismometers.

3. A system as recited in claim 1 including
a. means for controlling the gain of said operational amplifier by changing the ratios of input and feedback signals summed at said inverting and non-inverting differential input terminals, while substantially maintaining a balanced condition in said seismometer output-operational amplifier input circuit, said gain control means having a pair of input terminals and a pair of output terminals;

b. means for connecting said individual seismometers to said pair of said gain control means' input terminals; and
c. means for connecting said gain control means' pair of output terminals to said differential input terminals of said operational amplifier.

4. A system as recited in claim 3 in which said gain control means is located within said individual seismometer being manually adjustable by an external knob.

5. A system as recited in claim 3 in which said gain control means comprises:
a. an array of essentially equal valued pairs of fixed resistors chosen to provide a series of predetermined gains for said operational amplifier; and
b. means for externally selecting one of said essentially equal valued pair of resistors from said array of fixed resistors between said input and said output terminals to adjust the ratio of input to feedback signals to a predetermined value, whereby a plurality of said seismometers and their associated operational amplifiers may be employed for spatial filtering.

6. A system as recited in claim 1 where said feedback means comprises:
a. at least two essentially identical networks of capacitors and resistors chosen to provide a predetermined frequency response transfer function for said operational amplifier; and
b. a means for substituting said networks into said operational amplifier's balanced feedback circuit 7. A system as recited in claim 1 further comprising:
a. An active filter stage containing at least one additional monolithic operational amplifier for adjusting the frequency response of said individual seismometer signal, each said additional operational amplifier having a positive and a negative power supply terminal, a separate quiescent current control terminal, an inverting input terminal, a non-inverting input terminal, and an output terminal;
b. additional battery means connected to said power supply terminals for supplying predetermined voltages to each said additional operational amplifier, each said additional battery means having an intermediate point for coupling to a succeeding stage;
c. means for connecting said input terminals of each additional operational amplifier to said output and said intermediate battery point of the preceding operational amplifier;
d. means for connecting said output terminal and said intermediate battery point of the final additional operational amplifier to said transmission means;
e. at least one additional quiescent current adjusting means for controlling the quiescent current drawn by each said additional operational amplifier without appreciably altering said predetermined voltage at said positive and negative power supply terminals of each of said additional operational amplifiers, each said quiescent current adjusting means connected between said separate quiescent current control terminal of said additional operational amplifier and said battery means; and
f. at least one additional network of capacitors and resistors for providing a predetermined frequency response transfer function of said active filter stage, each said network providing an unbalanced feedback signal between said output terminals and said inverting input terminals of one of said additional operational amplifiers said unbalanced feedback signals being of sufficient magnitude to reduce the AC impedance at said final operational amplifiers output terminals to a value substantially less than the AC input impedance of said transmission means both measured at seismic frequencies.

8. A system as recited in claim 7 where said additional operational amplifiers, said additional batteries, said quiescent current adjusting means, and said feedback networks are located within said individual seismometers.

9. A system as recited in claim 7 including:
means for substituting one of said capacitor and resistor feedback networks for another, thereby changing said additional feedback networks' resistor and capacitor values to permit on-site alteration of said frequency response transfer function of said active filter stage.

10. In a method of seismic surveying of the type wherein electrical signals are generated by a plurality of seismometers in response to impinging seismic waves, said electrical signals are transmitted to a remote location by a transmission means, amplifying and recording said electrical signals at said remote location, the improvement comprising:
a. buffering the impedance between said seismometers and said transmission means prior to transmission of said electrical signals by increasing the feedback to electrical input signal ratio in monolithic operational amplifiers located adjacent to said seismometers, such that the output impedance of said amplifiers are substantially less than the input inpedance of said transmission means; and
b. isolating said seismometers one from another and from the variable damping resistances characteristic of said transmission means by said monolithic operational amplifiers.

11. A method of seismic surveying as recited in claim 10 further comprising controlling the gain of said monolithic operational amplifier by changing the ratio of feedback to electrical input signals summed at said amplifiers differential input terminals such that input circuit balance is maintained thereby permitting adjustment of the individual amplitudes of said electrical signals from said seismometers for spatial filtering.

12. A method of seismic surveying as recited in claim 10 further comprising substituting one capacitor resistor feedback network for another thereby adjusting the frequency response of said monolithic operational amplifier to provide frequency filtering of said electrical signal prior to transmission by said transmission means to said remote amplifying and recording location.

* * * * *